United States Patent [19]
Pigott et al.

[11] Patent Number: 5,197,395
[45] Date of Patent: * Mar. 30, 1993

[54] PLASTIC PALLET WITH DECK ASSEMBLY

[76] Inventors: Maurice J. Pigott, 591 Cherry St., Winnetka, Ill. 60093; Brandon L. Pigott, 1017 Elmwood Ave.; Peter S. Pigott, 803 Elmwood Ave., both of Wilmette, Ill. 60091; Schuyler F. Pigott, 1122 N. Patton St., Arlington Heights, Ill. 60004

[ * ] Notice: The portion of the term of this patent subsequent to Jul. 4, 2006 has been disclaimed.

[21] Appl. No.: 644,928

[22] Filed: Jan. 23, 1991

[51] Int. Cl.⁵ .............................................. B65D 19/12
[52] U.S. Cl. ..................................... 108/56.1; 108/902
[58] Field of Search ................. 108/56.1, 901, 902, 108/51.1, 56.3

[56] References Cited

U.S. PATENT DOCUMENTS

| | | | |
|---|---|---|---|
| 3,424,110 | 1/1969 | Toot | 100/901 X |
| 3,835,792 | 9/1979 | Wharton | 108/902 X |
| 3,916,803 | 11/1975 | Garcia | 108/51.1 |
| 4,128,253 | 12/1978 | Powers | 108/55.1 X |
| 4,843,976 | 7/1989 | Pigott et al. | 108/56.3 X |

FOREIGN PATENT DOCUMENTS

| | | | |
|---|---|---|---|
| 2101346 | 3/1972 | France | 108/902 |
| 1310898 | 3/1973 | United Kingdom | 108/902 |

Primary Examiner—Jose V. Chen
Attorney, Agent, or Firm—Wallenstein Wagner & Hattis, Ltd.

[57] ABSTRACT

A plastic pallet (10) includes two identical decks (12, 120) that are interconnected by identical connectors (14). Each connector includes a central core (20) and a surrounding sleeve (44) interconnected by spokes (46). The core has flexible tangs (28) that extend beyond opposite ends of the sleeve and lock onto the deck. Each deck includes a plurality of respective segments (130) consisting of a pair of open shells (132, 134) and the periphery of each deck is reinforced by respective segments (182) that are internally reinforced by gussets (192, 194).

15 Claims, 3 Drawing Sheets

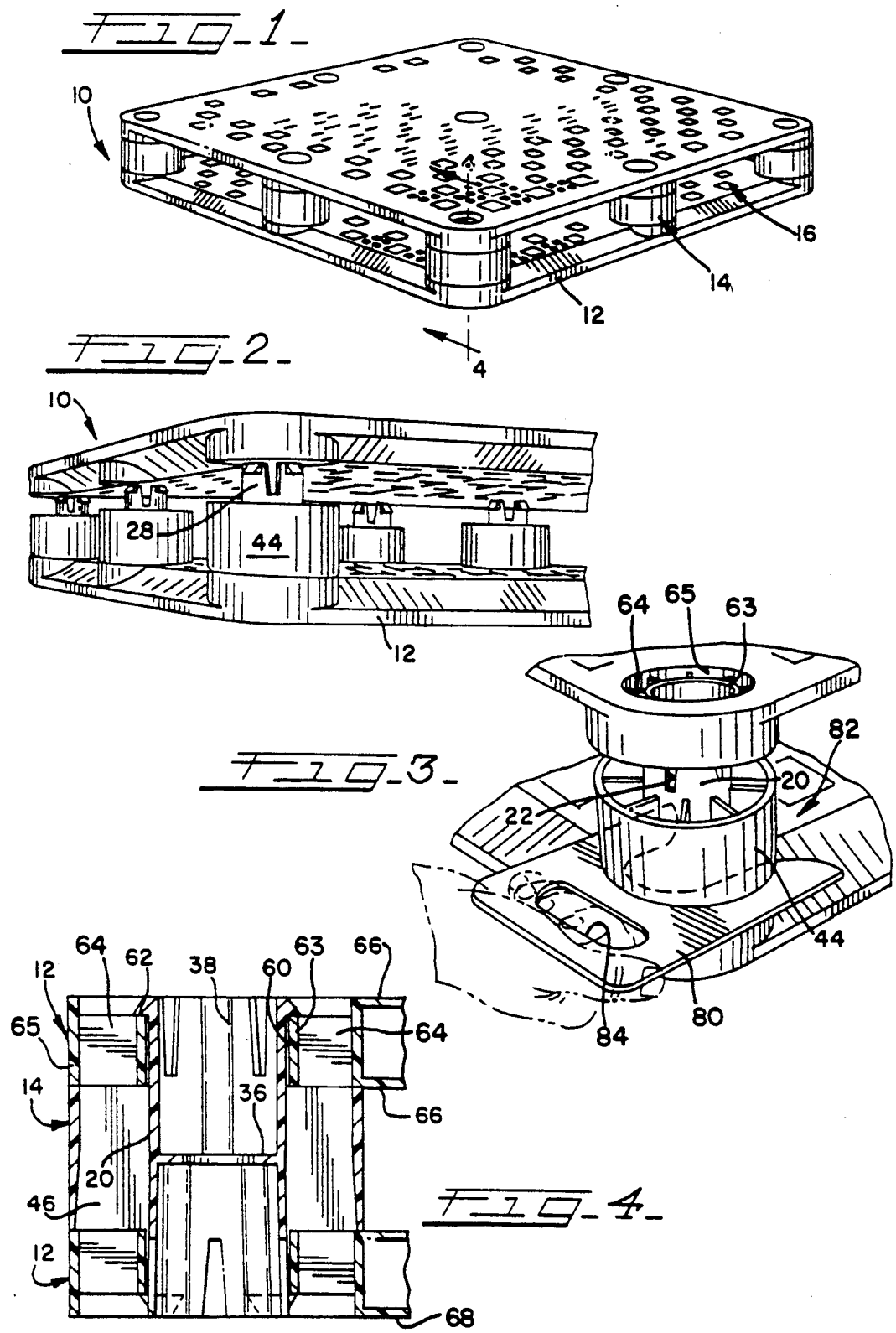

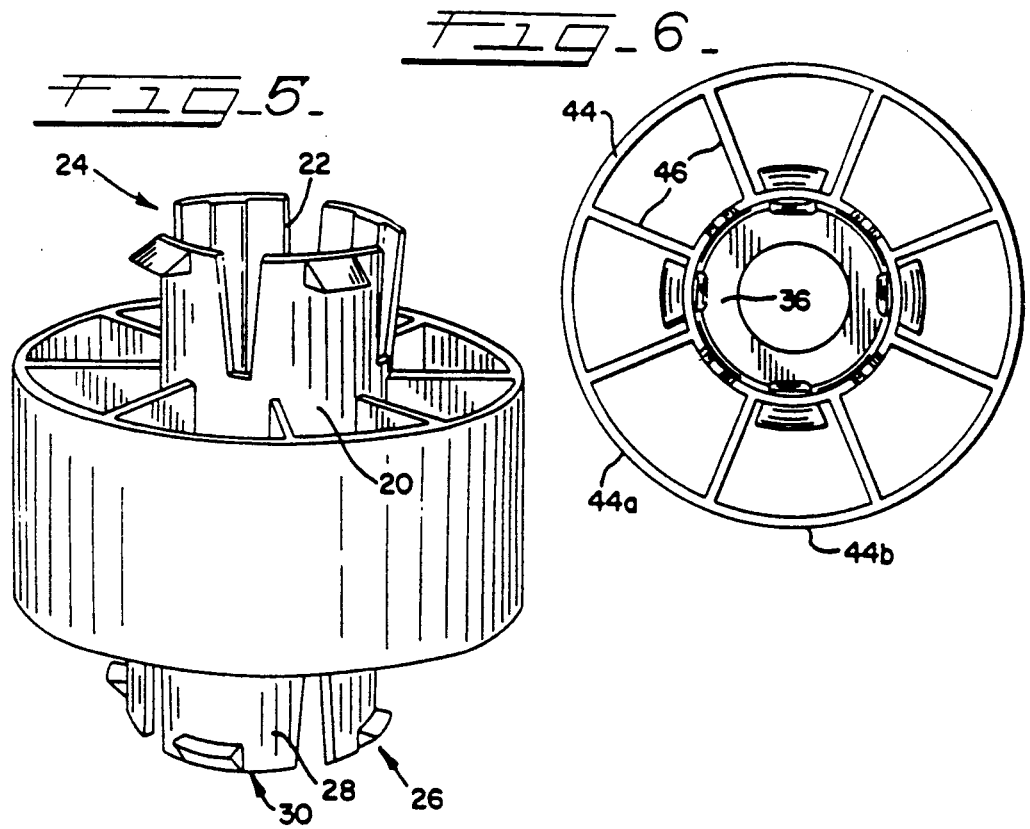
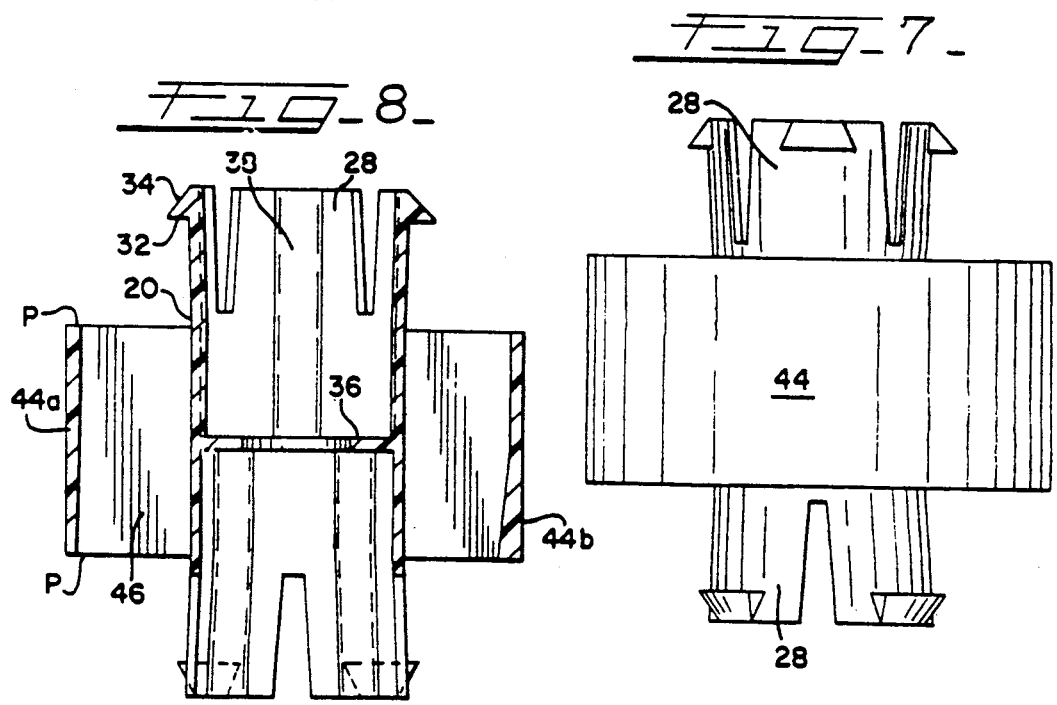

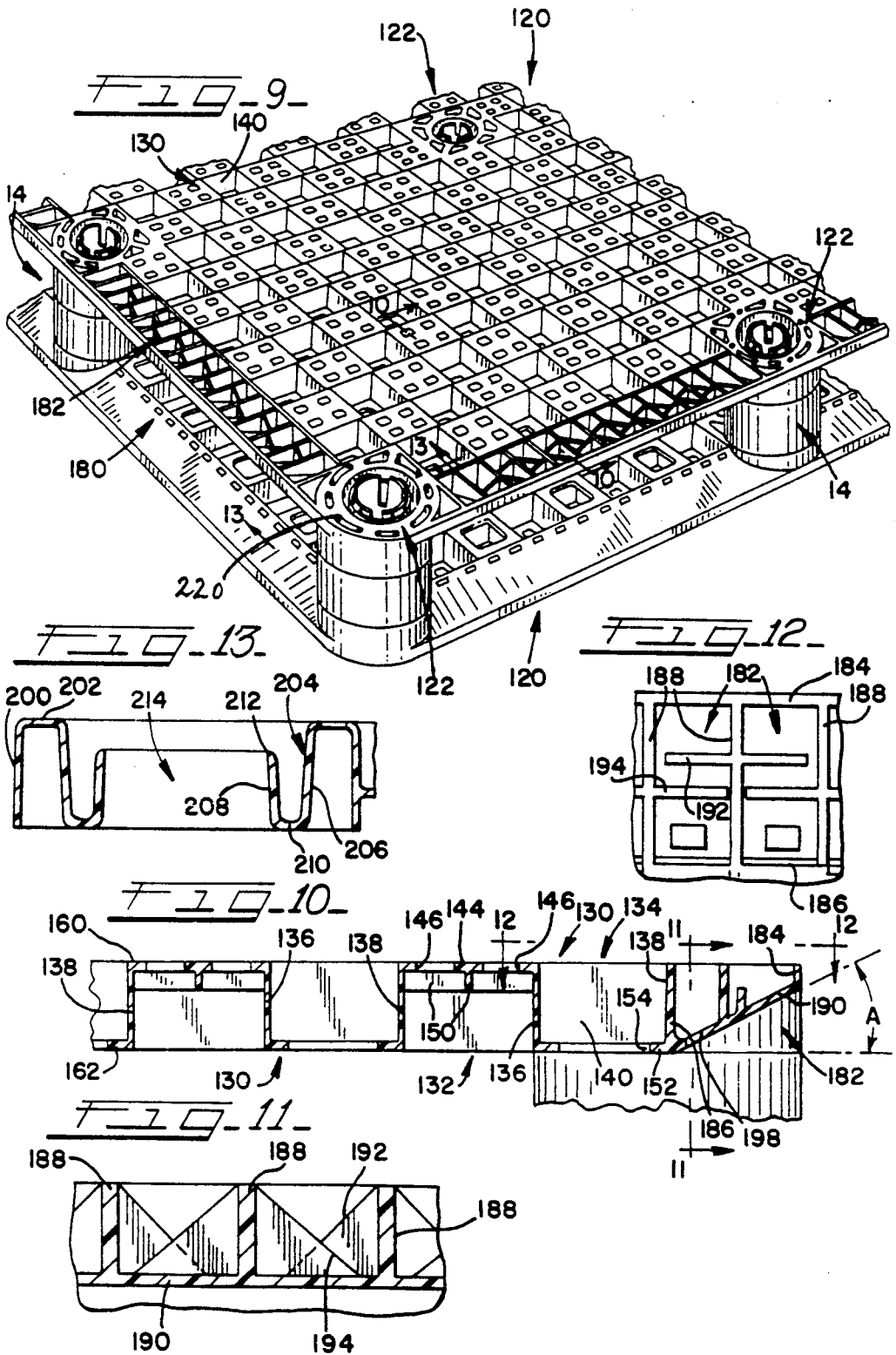

PLASTIC PALLET WITH DECK ASSEMBLY

REFERENCE TO RELATED APPLICATION

This application is a Continuation of PCT Application No. PCT/US89/03314, filed Aug. 1, 1989, now abandoned, which was a Continuation-In-Part application of U.S. Ser. No. 230,025, filed Aug. 9, 1988, for a PLASTIC PALLET, now U.S. Pat. No. 4,843,976, issued Jul. 4, 1989.

TECHNICAL FIELD

The present invention relates generally to pallets useful in material handling and more particularly molded plastic pallets designed for use with forklift equipment.

BACKGROUND ART

For a number of years, wooden pallets have been the mainstay of the material handling business. In the past, wooden pallets have provided advantages of economy, simplicity and durability, principally because of the lack of other suitable materials. However, wooden pallets are extremely heavy and require costly hand labor in their fabrication.

In the past decades, disposable pallets have been proposed and, with the growth of the plastics industry, a wide variety of plastics have been investigated to determine their suitability for use in producing pallets. Plastic pallets can easily be molded and are stronger and lighter in weight than wooden pallets. Furthermore, plastic pallets are more durable than wooden pallets.

Examples of molded plastic pallets are disclosed in U.S. Pat. Nos. 3,814,031; 3,664,271; 3,610,173; 4,013,021; 4,316,419; 4,597,338; and 4,735,154.

Thus, while a number of plastic pallets have been proposed, these proposed solutions have not been widely accepted and there remains a need for a plastic pallet that is light in weight, durable, capable of supporting heavy loads and is easy to manufacture and have a minimum number of parts that are preferably interchangeable.

SUMMARY OF THE INVENTION

According to the present invention, a plastic pallet has been developed which includes a pair of identical frame members or decks that are interconnected by specially designed connectors and can be assembled without the need for any specially designed tools. The plastic pallet is designed such that the connectors can be snap fitted onto the decks.

More specifically, the frame members or decks have openings which define surrounding abutments that are recessed below the exposed surface and the connectors have flexible tangs that have barbs which engage the abutments.

Each connector consists of a hollow circular core which has slots extending from opposite ends to produce first and second sets of tangs. Spokes are integral with the peripheral surface of the core between the tangs and a sleeve is integral with the outer ends of the spokes.

According to one aspect of the invention, the sleeve has tapered portions between each pair of spokes and alternating tapered portions are reversely tapered to provide additional rigidity for the connectors. Additionally, the hollow core has a force-absorbing inner flange equally spaced from the respective tangs and has axial ribs extending from the flange aligned with a tang. Each tang has a tapered barb adjacent a free end and an aligned inner integral rib which extends to the flange so that forces transmitted to the tangs are directed toward the flange.

According to one aspect of the present invention, the decks are constructed to be mirror images of each other and can be molded with a minimum amount of material and yet be capable of withstanding considerable forces that are normally encountered during use of the pallet. The deck consists of a plurality of substantially identical segments that are repeated throughout the body of the deck between generally planar spaced parallel surfaces. Each segment includes two generally rectangular hollow shells that have a common intermediate wall and spaced end walls with the end walls interconnected along opposite edges by a pair of side walls. Each shell has a closed end interconnecting the walls and the closed ends are integral with respective edges of the intermediate wall and the end walls so that the respective shells are open in opposite directions to the respective parallel surfaces.

Each deck is reinforced around the perimeter and has openings at each of the corners thereof. The reinforced perimeter is defined by a plurality of identical segments, each including a pair of end walls and a pair of opposed side walls with one edge of the walls having an integral wall that is located at an angle with respect to the planar surfaces of the deck. Each segment has a drain opening in the bottom wall adjacent one end wall and has reinforcing means located therein. The reinforcing means is in the form of a pair of gussets that are integral with the integral wall and a side wall. The respective gussets, which are triangular, terminate spaced from the opposite side wall to define a flow path from one end of the closed end wall to the drain opening.

According to one further aspect of the invention, a separator tool has been developed that can be used to separate the connectors from the deck. The separator tool consists of a main body that is tapered from one end toward the opposite end and has a slot extending from the narrower end. The slot has a width that is greater than the width or diameter of the core. The separator tool is forced between the surface of the deck and a plane defined by the sleeve and the spokes to flex the tangs and release the connector from the deck or frame.

BRIEF DESCRIPTION OF DRAWINGS

FIG 1 is a perspective view of the plastic pallet constructed in accordance with the teachings of the present invention;

FIG. 2 partial perspective view showing the pallet in a partially assembled condition;

FIG. 3 is a partial perspective view showing the separator tool being used to separate a connector from a deck;

FIG. 4 is a cross-sectional view, as viewed along line 4—4 of FIG. 1;

FIG. 5 is a top perspective view of the connector;

FIG. 6 is a top plan view of the connector;

FIG. 7 is side view of the connector;

FIG. 8 is a cross-sectional view of the connector;

FIG. 9 is a fragmentary perspective view of a plastic pallet which incorporates a novel deck structure;

FIG. 10 is a fragmentary cross-sectional view, taken along line 10—10 of FIG. 9;

FIG. 11 is a fragmentary cross-sectional view, taken along line 11—11 of FIG. 10;

FIG. 12 is a fragmentary plan view, taken along line 12—12 of FIG. 10; and,

FIG. 13 is a cross-sectional view taken along line 13—13 of FIG. 9.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

FIG. 1 of the drawings shows a plastic pallet, generally designated by reference numeral 10, and includes a pair of identical rectangular decks or frame members 12 that are interconnected by a plurality of connectors 14. In the illustrated embodiment, nine connectors are shown, which are positioned at the four corners of the frame members and between each of the corners as well as in the center of the frame members. The connectors are positioned so that forklift tine receiving openings 16 are formed between the connectors 14 and the decks 12.

The details of the connectors are illustrated in FIGS. 4-8. As illustrated therein, each connector 14 includes a hollow central circular core 20 that has circumferentially spaced slots 22 extending from opposite ends thereof which produce first and second sets of tangs 24 and 26. Each tang 28 is identical in construction and has a barb 30 (FIG. 8) formed adjacent a free end thereof. Each barb 30 has a flat lower surface 32 which extends perpendicular to the axis of the core and has a tapered surface 34 extending from the outer edge to define a ramp.

In the illustrated embodiment, four tangs are shown on each end of the core with each tang spanning approximately ninety degrees. It should be noted that the tangs of the respective sets on opposite ends of the core are circumferentially offset so that the slots forming one set of tangs are axially aligned with the centers of the opposite set of tangs.

The central core also has a force absorbing flange 36 located at the center thereof, and equally spaced from opposite ends. In addition, each tang has an inner integral reinforcing rib 38 which extends from the flange to the free end and is aligned with the barb 30. Thus, forces applied to the tangs are transmitted by the ribs 38 to the flange 36 where they are dissipated.

Each connector also includes a large circular sleeve 44 that surrounds the core and is connected thereto by radially extending spokes 46. The upper and lower edges of the spokes and the sleeve define planes P which extend perpendicular to the axis of the core, for a purpose to be described later.

According to one aspect of the invention, the sleeve is configured to absorb large forces without being destructed. Thus, the sleeve has portions 44a and 44b, which are respectively located between alternating pairs of spokes. The sleeve portions 44a and 44b are tapered from one edge to the opposite edge. However, sleeve portion 44a has its thickest portion adjacent the upper edge of the sleeve, as viewed in FIG. 8, while sleeve portion 44b has its thickest portion adjacent a lower edge of the sleeve. Stated another way, the sleeve portions have alternating reverse tapers to increase the strength thereof.

As clearly shown in FIG. 4, each deck or frame member 12 has openings 60 which are adapted to receive tangs 28 and the openings are surrounded by abutments 62 that are recessed below the adjacent surface 66 of the deck means. The abutments 62 are defined by sleeves 63 which are connected by spokes 64 to peripheral members 65. The abutment is spaced from an opposite surface 68 by a dimension equal to the spacing between plane P and the surface 32 of barb 30 so that the barbs will snap into position, as will be described later, and will be located entirely inside the planes P.

To assemble the plastic pallet, the connectors are first assembled to one deck by aligning a set of tangs 24 or 26 with an opening 60 and then applying an axial force which causes the ramps 34 of the barbs to deflect the tangs inwardly sufficient to allow the set of tangs to pass through the openings. After the barb 30 has cleared the abutment surface 62, the elastic memory characteristics of the plastic will snap the tangs back to their original condition and lock the connector to the frame member 12. After all of the connectors are assembled on one deck, the second deck is positioned as shown in FIG. 2 and a force is applied to the top surface to complete the assembly of the plastic pallet.

In the assembled condition illustrated in FIG. 1, the adjacent connectors will provide an open space 16 for the reception of the tines of a forklift truck (not shown) and the round surfaces of the connector sleeves 44 will tend to guide the tines into the space 16.

According to a further aspect of the invention, a simple tool has been developed that can be used to separate the connector from the deck. As illustrated in FIG. 3, the tool 80 consists of a main body that has a progressively increasing taper from one end to the opposite end thereof. A slot 82 extends from the pointed end of the main body. The slot has a width that is greater than the diameter of the core 20. The main body also has an opening 84 for gripping by the hand of the user.

In use, the tool is positioned as shown in FIG. 3 and a force is applied to the end to wedge the tool between the plane P of the connector and the adjacent surface of the deck. With sufficient force, the tangs will be deflected inwardly sufficiently to clear the edge of the abutment and allow the connector to be separated from the deck.

The advantages of the tool are apparent. The tool is easy to fabricate at a minimum cost and can be supplied with each pallet order at minimal additional cost. Thereafter, the owner can easily replace defective connectors without discarding any usable components of the pallet.

FIGS. 9-13 show a modified form of pallet assembly incorporating a novel deck assembly that provides significantly increased rigidity while utilizing a minimum amount of plastic material. In the embodiment illustrated specifically in FIG. 9, the connectors 14 are identical in construction to the connectors described above, while the upper and lower decks 120 are identical in construction and are mirror images of each other.

Each deck 120 is generally rectangular and has connector support members 122 at each of the corners thereof, as well as intermediate the respective corners, as shown in greater detail in FIG. 1. Each deck 120 incorporates a plurality of substantially identical segments 130 (FIG. 10) that consist of a pair of generally rectangular open-ended shells 132 and 134. For this purpose, each segment 130 includes an intermediate, generally vertical wall 136 and a pair of end walls 138 interconnected by side walls 140.

In the embodiment illustrated, the shell 132 has a wall 144 that extends between intermediate wall 136 and one end 138 as Well as side walls 140. The wall 144 has a plurality of openings 146 that are preferably rectangular, there being four in number. The end wall 144 is reinforced by a pair of integral flanges 150 that define a cross between the respective openings 146 and are integral at opposite ends with the intermediate wall 136, the end wall 138 and the side walls 140.

Likewise, the shell 134 has an integral wall 152 that has a generally rectangular opening 154. The openings 146 and 154 not only provide drainage for the entire deck, but also reduce the amount of plastic material required for forming the deck. The reinforcing flanges 150 are preferably located along the exposed surface 160 of the deck, while the walls 152 are located along the opposite surface 162, which is the non-exposed surface of the deck.

Utilizing substantially identical segments 130 for the formation of the entire deck 120 provides extreme versatility in the overall configuration of the deck by utilizing separate identical mold inserts for the formation of each of the segments 130. Preferably, although not necessarily, the respective deck segments 130 are generally rectangular and are approximately 2 inches in width and approximately 4 inches in length so that each of the shells 132 and 134 are square in cross-section.

According to another aspect of the invention, the deck 120 of the present invention incorporates a novel reinforcing means around the perimeter thereof which substantially increases the rigidity of the deck, particularly when the product is banded to the deck for shipment.

The peripheral reinforcing means is generally designated by reference numeral 180 in FIG. 9 and consists of a plurality of substantially identical segments 182 that are formed integral with each other and are located between the respective adjacent connector support members 122. The details of the peripheral reinforcing segments 182 are shown in FIGS. 11-13 and include a pair of end walls 184 and 186 and a pair of side walls 188. It should be noted that one side wall 188 is a common wall for two adjacent reinforcing segments 182.

The end walls 184 and 186 are joined by an inclined wall 190 which is preferably inclined with respect to deck surface 162 by an angle A, which is preferably on the order of about 27°, although this angle may vary to suit the desires of the ultimate purchaser.

Each of the segments 182 has integral reinforcing means in the form of a pair of triangular gussets 192, 194 that are integral with a side wall 188 and inclined wall 190. As shown in FIG. 12, the respective gussets 192 and 194 terminate short of an opposing wall 188 to define a flow path for any liquid that is received into the open shell. A drain opening 198 is provided in the inclined wall 190 adjacent the lower edge thereof so that any water accumulating in the segments or shells 182 will drain therefrom.

It should be noted that the end wall 138 of one of the adjacent segments 130, which define the body of the deck 120, is a common wall for one end wall 186 for the reinforcing segment 182, as is more clearly shown in FIG. 10. Again, the respective segments 182 are individually produced by a pair of cooperating mold inserts similar to the mold inserts described above and disclosed in the above-reference method and apparatus application.

It should also be noted that the inclined walls 190 define guide surfaces for the tines of a forklift when the decks are assembled with the connectors, shown in FIG. 9.

According to a further aspect of the invention, the connector support members 122 are configured to be easily molded in a single-step molding process and still provide the necessary reinforcement. Thus, as shown in FIG. 13, each support member 122 consists of a generally circular outer annular flange 200 that has an inwardly-directed annular flange 202 formed along one edge thereof. A substantially U-shaped annular member 204 is integral with the inner edge of flange 202 and has an outer leg 206 and an inner leg 208 interconnected by a U-shaped segment 210. The inner leg has an edge 212 surrounding opening 214 which is located below the flange 202 and defines an abutment similar to abutment 62 (FIG. 4) for engaging the shoulder 32 of connector 14. The connector support means 122, specifically the segment 208 and the annular flange 202, have drain openings 220 (FIG. 9).

As indicated above, the two pallet components are preferably injection molded from recycled material, such as polypropylene or similar thermoplastic material. Additionally, a pigment may be added to provide color combinations to suit the customer's needs.

Of course, the size and shape and the number of connectors can be varied without departing from the spirit of the invention. Also, while identical decks have been shown and described, the decks could have different shapes or configurations.

It will be appreciated that the simplicity of the plastic pallet reduces the inventory substantially since only two components are necessary. Also, since the frame member or deck only requires recessed shoulders formed in wells, the molds for producing the large decks are greatly simplified which reduces the production costs.

The intricate design of the connectors has several distinct advantages. The design is such that all external forces are transmitted to the center of the core, which will withstand the greatest force without destruction. Furthermore, the connectors are configured so that they are formed as one piece in a single stage mold to reduce the cost. Since the connectors and the decks are preferably injection molded from recycled plastic, the costs are further reduced.

Another significant advantage of the plastic pallet is that the connectors can easily be separated should one the connectors become damaged. This can be accomplished by the owner without return of the pallet assembly to the manufacturer.

While the specific embodiments have been illustrated and described, numerous modifications come to mind without significantly departing from the spirit of the invention and the scope of protection is only limited by the scope of the accompanying claims.

We claim:

1. A plastic pallet comprising a pair of substantially identical decks interconnected by a plurality of connectors with aperture means at at least each corner of said decks receiving said connectors, each said deck including a one-piece molded, generally rectangular structure having spaced, generally parallel surfaces surrounded by peripheral reinforcing means, said peripheral reinforcing means including a plurality of substantially identical hollow rectangular segments defined by opposed end walls and opposed side walls with a connecting wall joining one edge of each of said end and side walls, said connecting wall being inclined with respect to said deck surfaces, having a slope from one said end wall to said other end wall and having drainage means therein, and reinforcing gussets integral with said connecting wall and respective ones of said opposed side walls.

2. A plastic pallet as defined in claim 1, in which each of said decks includes a plurality of substantially identical hollow segments, each said hollow segment including a pair of hollow, rectangular shells respectively open adjacent respective parallel surfaces.

3. A plastic pallet as defined in claim 2, in which each said segment includes three substantially parallel spaced walls integral with a pair of side walls, a first pair of spaced walls and said side walls having an end wall adjacent a first of said surfaces and a second pair of spaced walls and said side walls having an end wall adjacent a second of said surfaces.

4. A load-bearing pallet as defined in claim 1, in combination with a separator tool for separating said connectors from said decks, said tool comprising a main body that is tapered from substantially a point at one end with a slot extending from said one end, said slot having a width that is greater than the diameter of said core so that said tool can be forced between said plane and an adjacent surface of said deck to apply sufficient force to flex said tangs and release said connector from said deck.

5. A plastic pallet comprising a pair of substantially identical decks interconnected by a plurality of connectors with aperture means at at least each corner of said decks receiving said connectors, each said deck including a one-piece molded, generally rectangular structure having spaced, generally parallel surfaces surrounded by peripheral reinforcing means, said peripheral reinforcing means including a plurality of substantially identical hollow rectangular segments, defined by opposed ends walls and opposed side walls with a connecting wall joining one edge of each of said end and side walls, and reinforcing gussets integral with said connecting wall and respective ones of said opposed side walls, and each said deck including a plurality of substantially identical hollow segments, each said hollow segment including a pair of hollow shells respectively open adjacent respective parallel surfaces and having three spaced walls integral with a pair of said walls, a first pair of spaced walls and said side walls having an end wall adjacent a first of said surfaces and a second pair of spaced walls and said side walls having an end wall adjacent a second of said surfaces, said aperture means including a generally U-shaped annular segment defining an abutment surrounding an opening which receives said connector and connecting means connecting said annular segment along one of said surfaces.

6. A load-bearing pallet comprising a pair of substantially identical decks having a plurality of spaced openings therein which are positioned to be vertically aligned and connector members received into said openings for interconnecting said decks, each said connector member including a substantially circular hollow central core having a plurality of flexible tangs extending from opposite ends thereof and received into said openings of respective decks to releasably interconnected said decks and an inwardly-directed force-absorbing flange intermediate opposite ends of said core.

7. A load-bearing pallet as define din claim 6, in which each said connector member includes a plurality of integral spokes extending from said central core between said flexible tangs with a sleeve integral with the free ends of said spokes, said spokes and sleeve defining planes that engage adjacent surfaces of respective frame members.

8. A load-bearing pallet as defined in claim 6, in which said core includes inner longitudinal ribs extending from said flange to a free end of each of said tangs.

9. A load-bearing pallet as defined in claim 6, in which said tangs on respective ends of said core are circumferentially offset from each other and each tang has a tapered barb on an outer surface aligned with an inner rib.

10. A load-bearing pallet as defined in claim 6, in which each of said decks includes a plurality of substantially identical hollow segments.

11. A load-bearing pallet as defined in claim 10, further comprising reinforcing means around the periphery of each deck.

12. A load-bearing pallet as defined in claim 11, in which said reinforcing means includes a plurality of substantially identical hollow shells.

13. A load-bearing pallet as defined in claim 10, in which each of said segments has spaced opposed parallel surfaces, each of said segments including a pair of open hollow shells respectively opening toward respective surfaces.

14. A load-bearing pallet comprising a pair of substantially identical decks having a plurality of spaced openings therein which are positioned to be vertically aligned and connector members received into said openings for interconnecting said decks, each said connector member including a substantially circular hollow central core having a plurality of flexible tangs extending from opposite ends thereof and received into said openings of respectively decks to releasably interconnect said deck, each said connector member further including a plurality of integral spokes extending from said central core between said flexible tangs with a sleeve integral with the free ends of said spokes, said spokes and sleeve defining planes that engage adjacent surfaces of respective decks, said sleeve including tapered portions between adjacent pairs of spokes and in which alternating tapered portions are reversely tapered.

15. A load-bearing pallet as defined in claim 6, in combination with a separator tool for separating said connectors from said decks, said tool comprising a main body that is tapered from substantially a point at one end with a slot extending from said one end, said slot having a width that is greater than the diameter of said core so that said tool can be forced between said plane and an adjacent surface of said deck to apply sufficient force to flex said tangs and release said connector from said deck.

* * * * *